United States Patent
Sadiku

Patent Number: 6,148,499
Date of Patent: Nov. 21, 2000

[54] METHOD AND DEVICE TO DRAW-IN COILS INTO SLOTS OF STATOR LAMINATED CORES OF ELECTRIC MACHINES

[75] Inventor: Sadik Sadiku, Neuberg, Germany

[73] Assignee: ELMOTEC Elektro-Motoren-Technik GmbH, Karben, Germany

[21] Appl. No.: 09/155,443

[22] PCT Filed: Jan. 15, 1998

[86] PCT No.: PCT/DE98/00121

§ 371 Date: Dec. 16, 1998

§ 102(e) Date: Dec. 16, 1998

[87] PCT Pub. No.: WO98/33261

PCT Pub. Date: Jul. 30, 1998

[30] Foreign Application Priority Data

Jan. 24, 1997 [DE] Germany ............ 197 02 479
Feb. 28, 1997 [DE] Germany ............ 197 08 089

[51] Int. Cl.[7] .................................. H02K 15/00
[52] U.S. Cl. .................. 29/596; 29/736; 29/606
[58] Field of Search ................ 29/732, 734, 736, 29/596, 606, 565

[56] References Cited

U.S. PATENT DOCUMENTS

| | | | |
|---|---|---|---|
| 3,324,536 | 6/1967 | Hill | 29/606 |
| 3,858,296 | 1/1975 | Gage | 29/596 |
| 4,304,045 | 12/1981 | Barrera | 29/596 |
| 4,433,475 | 2/1984 | Kubota et al. | 29/736 |
| 4,477,966 | 10/1984 | Napierski | 29/596 |
| 4,480,379 | 11/1984 | Witwer | 29/596 |
| 4,521,958 | 6/1985 | Barrera | 29/734 |
| 4,536,954 | 8/1985 | Hattori | 29/736 |
| 5,826,321 | 10/1998 | Pease | 29/734 |

FOREIGN PATENT DOCUMENTS 0 052 852  6/1982  European Pat. Off. .
0 154 763  9/1985  European Pat. Off. .

*Primary Examiner*—Lee Young
*Assistant Examiner*—A. Dexter Tugbang
*Attorney, Agent, or Firm*—Evenson, McKeown, Edwards & Lenahan, P.L.L.C.

[57] ABSTRACT

A method and apparatus for drawing windings into slots in laminated stators of electrical machines by producing coils on a form and transferring the coils onto an insertion tool. The insertion tool includes appropriately annularly arrayed parallel short and long insertion shafts having free ends and an axially driven insertion block fastened to the short insertion shafts. In a first phase of the insertion process, the insertion tool draws in the coils into the slots where the short insertion shafts and long insertion shafts, with their free ends, move upward from a starting position through the bore of the stator past the upper edge of the stator to a second position. In a second phase, the long insertion shafts are retracted to a third position with their free ends just above the upper edge of the stator while the insertion block and the short insertion shafts move together forward to the third position. In a third phase, the insertion block, the short insertion shafts and the long insertion shafts return from their respective third position to the starting position.

19 Claims, 11 Drawing Sheets

METHOD AND DEVICE TO DRAW-IN COILS INTO SLOTS OF STATOR LAMINATED CORES OF ELECTRIC MACHINES

BACKGROUND AND SUMMARY OF THE INVENTION

The invention relates to a method and an apparatus for inserting coils into slots in the cores of electrical machines, the coils being produced on a form and transferred onto an insertion tool consisting of parallel insertion shafts arranged in a circle and an axially driven insertion block, and being drawn thereby into the stator slots.

In the case of certain ratios between the wire size and the width of the space between the insertion shafts as well as other unfavorable factors, the windings tend to jam in the slots when they are advanced by the insertion block along stationary shafts. As a remedy it is known to run together with the insertion block one of two insertion shafts carrying a particular coil strand (cf. DE-PS 19 18 485). It is furthermore known in this connection to run all of the insertion shafts together with the insertion block in the first phase of the insertion process, then to set the free ends of the insertion shafts at approximately the level of the opposite face of the laminated stator core, and lastly to perform the remainder of the insertion movement with the insertion block alone, which in a known manner runs past the free ends of the insertion shafts in order to shape the ends of the coils radially (cf. DE-OS 20 06 526 and DE-AS 26 30 183).

It is a disadvantage that just at the end of the insertion process the insertion block must cover a very long distance while the insertion shafts are already stopped, so that wire jamming can occur. Especially in the case of relatively high coil build-up the entire insertion can be performed but quickly, and then a very long distance must be traveled by the insertion block while the insertion shafts are already at a standstill.

Since the requirements of the winders of compressor motors increase from year to year, and one is striving to improve the efficiency of the motors by not only reducing the size of the stator slots, but also requiring a high fill factor, these new stators can no longer be wound by the insertion method and apparatus known in the state of the art. If it is desired to wind these new stators with, for example, the apparatus of German Patent 26 30 183, it will be found that the insertion stroke with all accompanying shafts through the stator bore and on past the top edge of the stator will work the first time, but the high coil build-up in the slots between the shafts forces the shafts apart at their free upper ends, so that the shafts can not be pulled back down without forcing and this damages the coils.

The invention therefore is addressed to the problem of creating a method and an apparatus of the kind described above by which conditions in the middle and at the end of the insertion process can be improved over the state of the art.

The new method proposed for the solution of the above problem is characterized in that, in a first phase of the insertion process, the insertion block and the short insertion shafts and long insertion shafts are driven synchronously with their upper open ends from a first position through the bore of the stator past the upper edge of the stator to a second position, and that in a second phase the long insertion shafts are retracted to just above the upper edge of the stator, while the insertion block and the short insertion shafts run forward together to a third position, and that in a third phase the insertion block, the short insertion shafts and the long insertion shafts return from the third position to the starting position.

By the proposed method the advantage of all the insertion shafts traveling together is utilized, this movement permitting no relative movement between the coils and the insertion shafts, and thus also there being no danger that the wires may be damaged, while then the stroke of the long insertion shafts is reversed through half the length of the insertion stroke, and on their downward travel halt just above the upper edge of the stator, while the short insertion shafts travel continuously on and upward through the stator and insert the coils completely into the stator. In contrast to the insertion apparatus previously known, because of the retraction of the long insertion shafts not only do the wires move in the slot and do not jam, but the advantage also is that the long insertion shafts open the slot at one end by their retraction, so that the wires are no longer laid one over the other but shrink together in bundles.

To accelerate the last-mentioned advantage it is furthermore proposed that, in the second phase, the long insertion shafts be at least partially retracted before the insertion block and the short shafts travel forward. Now, after a number of wires are therefore no longer stacked one over the other, the long insertion shafts can descend or be withdrawn further, while then the insertion block and the short shafts travel simultaneously forward. In this manner forcible insertion is avoided, and especially the pressure on the insertion shafts is reduced.

In certain cases it is also conceivable to retract long insertion shafts to just above the top edge of the stator and only then move short insertion shafts forward.

As an aid in the insertion process in certain cases it is also proposed that, in the second phase, the long insertion shafts be retracted, while at the same time the insertion block and the short insertion shafts travel forward, or that in the second phase the long insertion shafts with the insertion block and the short insertion shafts run alternately. The last-named parts of the process can be employed if the coil build-up is not too high but a relatively great jamming of the wires in the slot is involved.

To accelerate the insertion process it is furthermore proposed that the insertion block and the short insertion shafts move together out of the starting position at a continuous speed past the second position to the third position. In which case it is then advantageous if the long insertion shafts travel from the second position to the third position at the same speed or a higher speed than the short insertion shafts.

No matter how the individual variants of the method have been described or may yet be set forth, it changes nothing of the basic idea of the invention, that in a middle insertion phase certain insertion shafts are retracted and the others travel forward, and that not only is the slot thereby freed at the top end, but also the wires are favorably influenced by the relative movement of two insertion shafts lying side by side.

The apparatus for the practice of the above-described method is characterized by the fact that, in the first phase of the insertion process, the short insertion shafts fastened to the insertion block are driven by one drive, in synchronism with the long insertion shafts which are fastened to a shaft holder and driven by another drive, from the starting position with its open upper ends past the top edge of the stator to the second position, and that in the second phase the first drive reverses and retracts the shaft holder together with the long insertion shafts to just above the upper edge of the stator, the second drive driving the insertion block forward to the third position, and that in the third phase the drives bring the insertion block and the shaft holder to the starting position.

It is also advantageous that the drives are freely controlled as to their speed and their changes of direction.

It is also advantageous if the insertion block and the short insertion shafts travel together from the starting position at a continuous speed through the second position to the third position, while the long insertion shafts travel from the second to the third position at the same speed or at a higher speed than the short insertion shafts. In the case of a higher speed in the long insertion shafts, a faster downstroke of the shafts takes place and therefore a faster opening of the slot at the top, so that the wires in the slot are no longer stacked one over the other but shrunk together in bundles.

As an aid for the new method it is also proposed to arrange above the top edge of the stator a support means consisting of a holding ring, supporting ring and abutments, which can travel axially if need be. Also radially moving abutments are conceivable but technically more complicated. The supporting means has the advantage that insertion shafts extending free above the top edge of the stator are centered and thus reduce the pressure on the stator teeth and it serves to prevent coil wires from jamming between the insertion shafts.

BRIEF DESCRIPTION OF THE DRAWINGS

Additional advantageous embodiments will be come apparent as the description of the preferred embodiments proceeds. Their special advantages will be seen in the following description of several embodiments of the invention in conjunction with the drawing, wherein.

DESCRIPTION OF THE PREFERRED EMBODIMENTS

Figure 1:
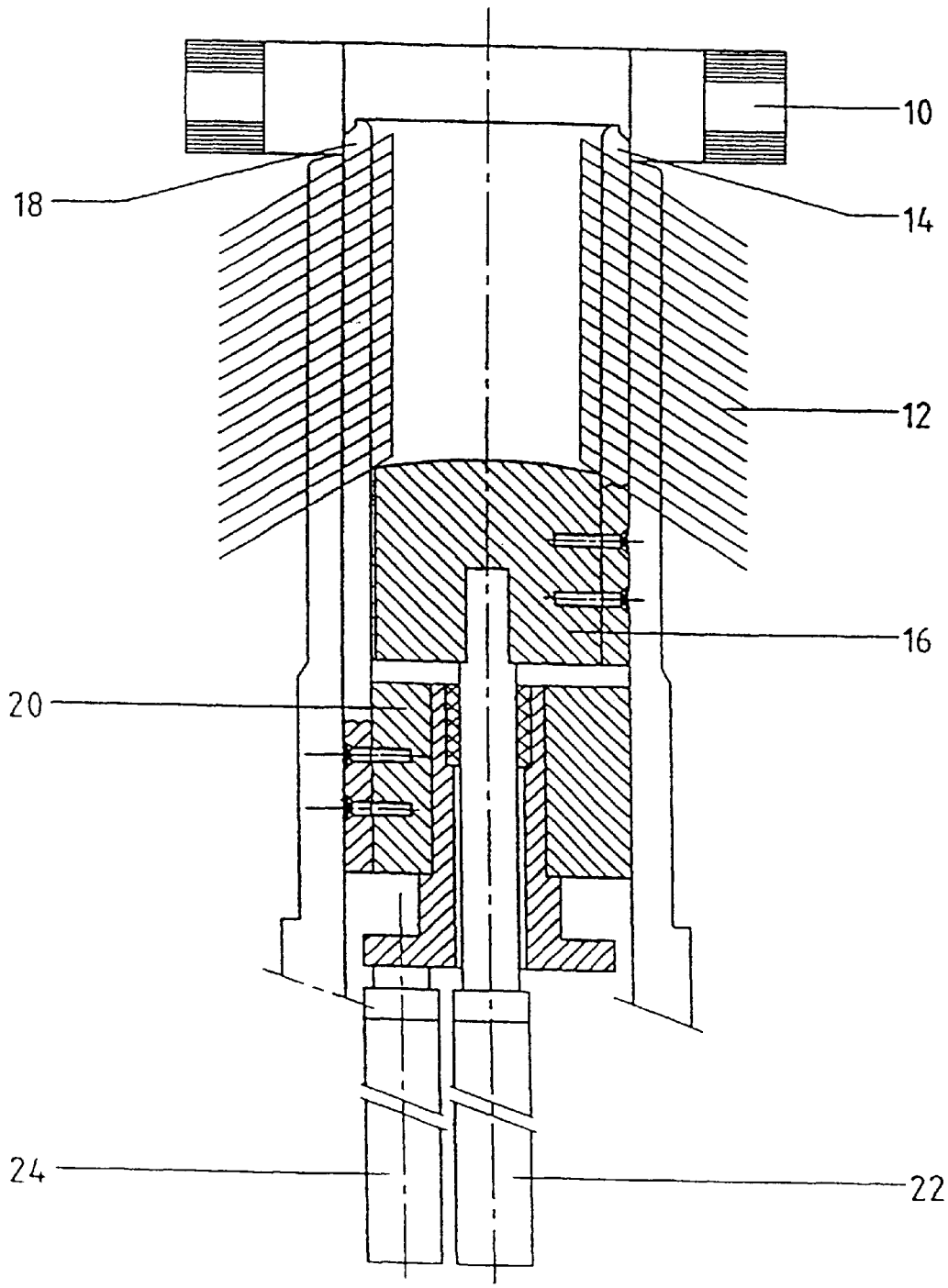
FIG. 1 shows a longitudinal section through an insertion tool according to the invention, in the starting position, FIG. 2 a longitudinal section in accord with FIG. 1, in a second position, FIG. 3 a longitudinal section in accord with FIG. 1, in a third position, FIG. 4 an enlarged view of the position of the coils between two insertion shafts, FIG. 5 a longitudinal section through an insertion tool according to the invention, in the starting position, FIG. 6 a longitudinal section in accord with FIG. 5 in a second position, FIG. 7 a longitudinal section in accord with FIG. 5 in a third position, FIG. 8 a plan view of FIG. 5 in the area of the holding ring, FIG. 9 an enlarged detail of FIG. 8, FIG. 10 an enlarged view of an additional variant from FIG. 8, FIG. 11 a view corresponding to FIG. 6 of an additional embodiment of the invention, FIG. 12 the embodiment of FIG. 11 in a third position, FIG. 13 a detail of the area of an abutment, and FIG. 14 a plan view of the area of the holding ring of the additional embodiment.

The tools shown in FIG. 1 can be part of an automatic coil winding and inserting apparatus which can have, for example, the basic design described in DE-OS 28 25 557.

FIG. 1 shows a ring of parallel insertion shafts with their free ends pointing upward, into which, before a pack of stator laminations 10 has been placed, coils 12 have been wound or transferred into the spaces between the shafts. The ring of insertion shafts consists of short insertion shafts 14, especially every second one in the area of the inserted coils 12, which are fixedly screwed to an insertion block 16, and of long insertion shafts 18, which are screwed to a shaft holder 20, the insertion block 16 being driven axially by a jack 22 and the shaft holder 20 by means of a jack 24. In practice, the insertion block 16 and shaft holder 20 are usually powered electromechanically, which type of power being here of lesser importance. What is important is, how each insertion block 16 with its short insertion shafts 14 and shaft holder 20 with its long insertion shafts 18 are operated, that is, which axial paths they run together, FIG. 2 and FIG. 3 show the same apparatus as FIG. 1, but each of them one step further on in the process.

Figure 2:
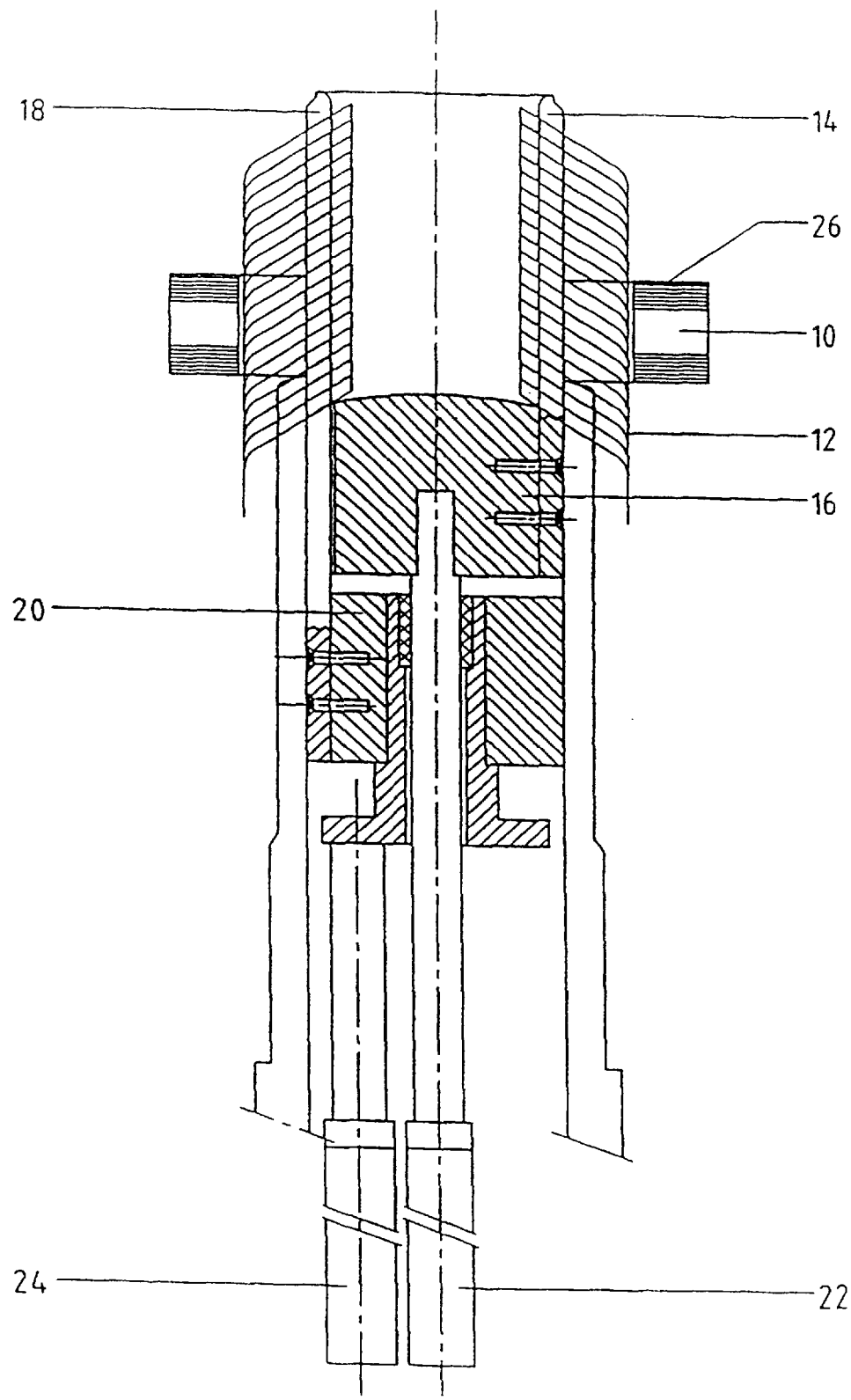

FIG. 2 shows a process step in which the free ends of the short insertion shafts 14 and the long insertion shafts 18 have been extended on their way through the stator bore past the upper edge 16 of the stator. On their course from the position in FIG. 1 to the position in FIG. 2 the insertion shafts 14 and 18 are operated in synchronism and have carried the coils 12 and drawn them partially into the stator 10.

Figure 3:
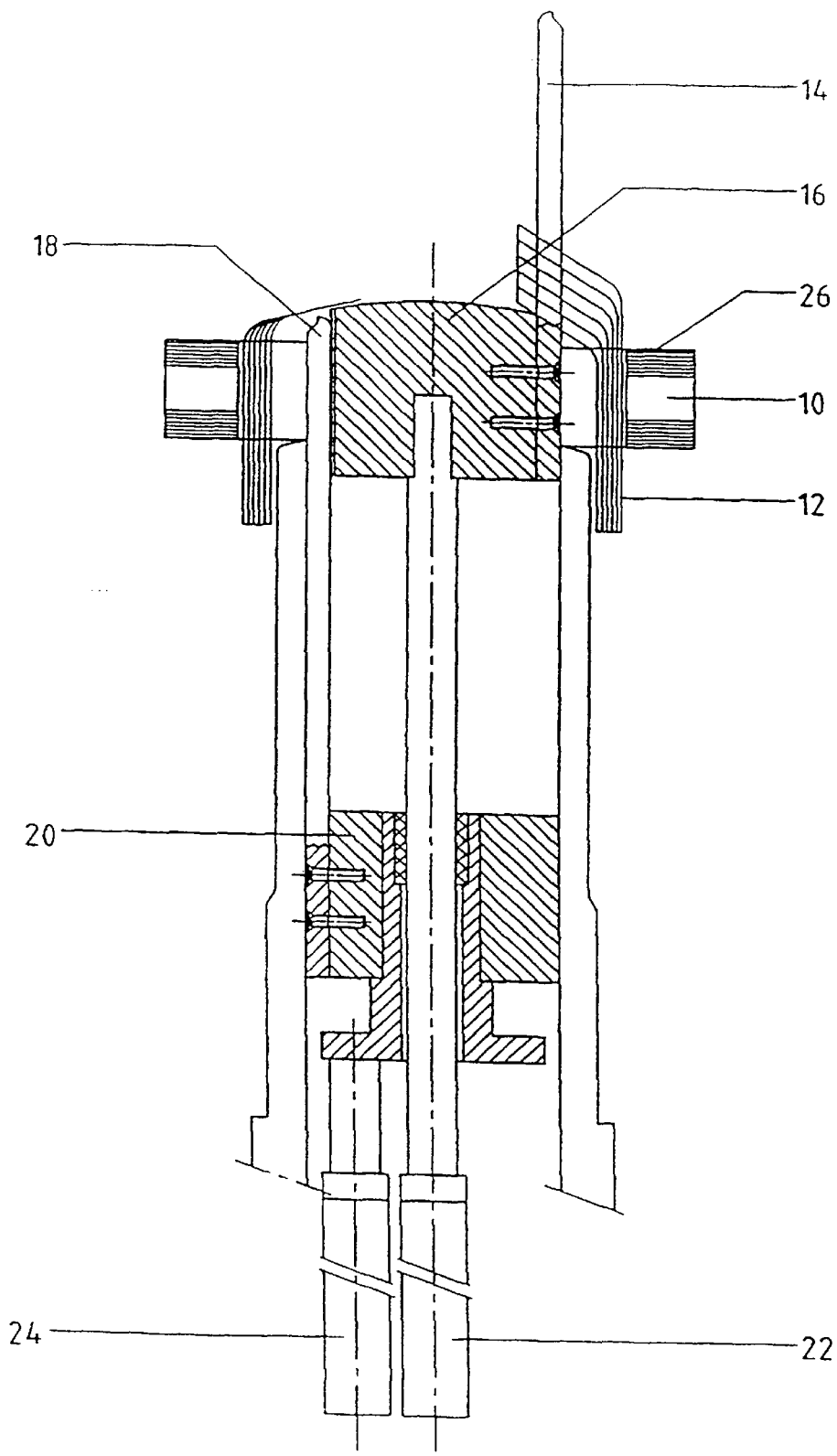

Now, from a position FIG. 2 in which the free ends of the insertion shafts 14 and 18 are above the upper edge 26 of the stator, the short insertion shafts 14 move axially upward and on through the stator 10, while the long insertion shafts 18 perform a contrary axial movement and thus move downward and stop with their free ends just above the top edge 26 of the stator, as can be seen in FIG. 3. Into this position FIG. 3 the insertion block 16 with the short shafts 14 has also arrived at a position above the free ends of the long insertion shafts 18 and has brought the coils 12 to their end position and drawn them in. Then the insertion shafts 14 and 18 run from position FIG. 3 back to position FIG. 1 and the completed stator can be removed. No mention shall be made of how cover strips close the filled slots at the end of the insertion process.

If the oppositely moving insertion shafts 14 and 18 move at equal speed, they will have reached their end position FIG. 3 simultaneously. Experiments have shown that it is advantageous to move the long shafts 18 downward relatively faster than the upwardly moving short shafts 14. The advantage is that the long shafts 18 by moving downward will already have released the coil wires from above and thus permit easier insertion.

Figure 4:
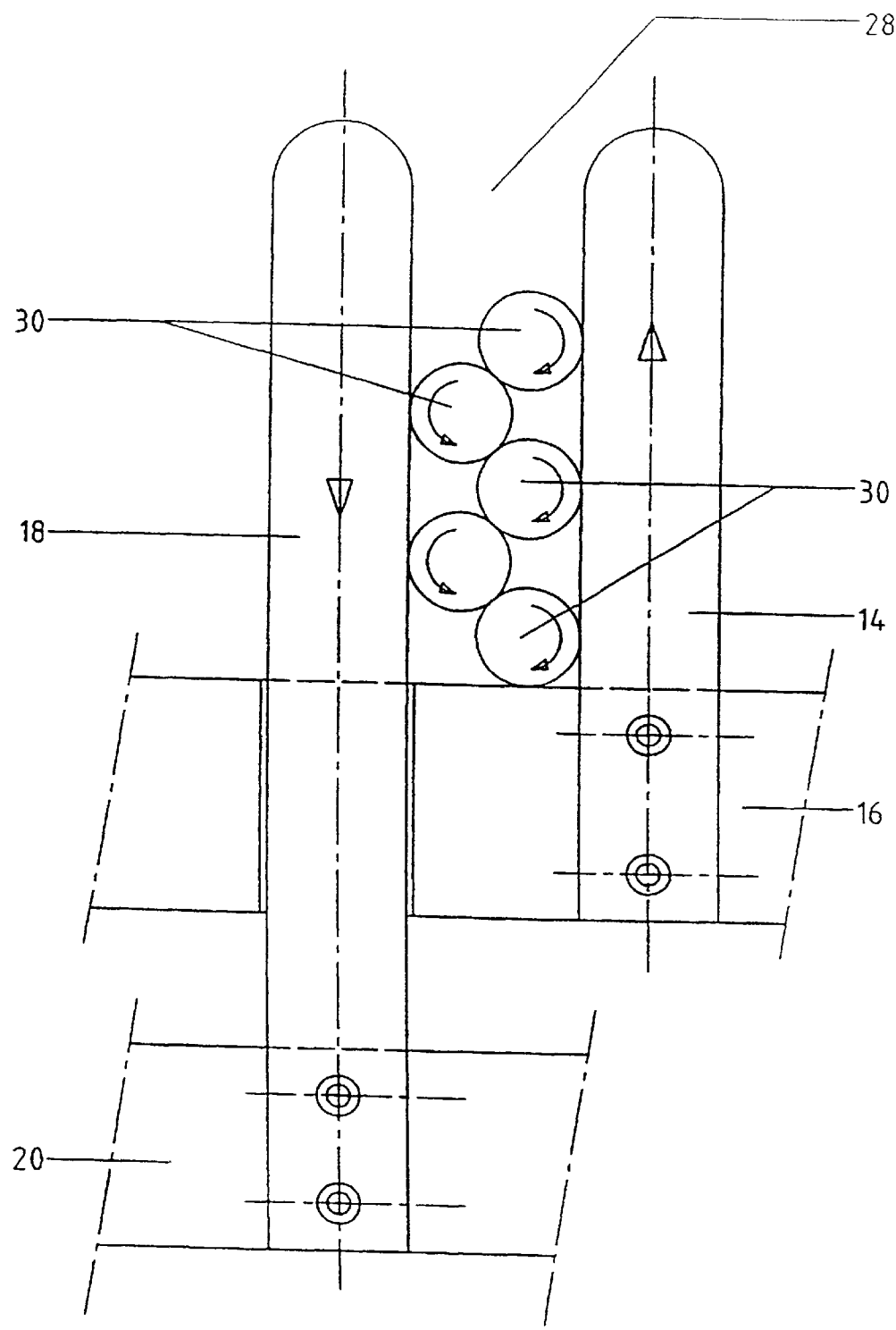

FIG. 4 shows the solution according to the invention on an enlarged scale. A short insertion shaft 14 and a long insertion shaft 18 can easily be seen. Between them is a space 28 in which coils 12 or individual wires 30 are shown in section.

The important insertion step is not so much the step from the FIG. 1 position to the FIG. 2 position, but the step from the FIG. 2 position to the FIG. 3 position. In this insertion step a downward stroke of the long insertion shafts 18 takes place and an upward stroke of the short insertion shafts 14, in which the insertion block 16 moves upward together with the short shafts 14 and with it pushes ahead of it all of the wires 30, which can have a wound coil height of 80 to 100 mm. The advantage of the invention is enhanced by the fact that the short insertion shaft 14 moves in the direction opposite that of the long insertion shaft 18. This signifies that the wires 30 between the shafts 14 and 18 acquire movement, and do so in the way in which a pencil is held between two palms of the hand and the palms move in opposite directions. Of course, the wires 30 are unable to roll along the entire shafts 14 and 18. But the invention exploits this rolling effect in that the wires 30 rotate by only a short amount of about a quarter turn; thus the entire height of the coil relaxes and then, due to this relaxation of the coil height, the wire 30 can snap back from its short, biasing rotation because the wire itself was under bias due to the initial rotation.

Figure 5:
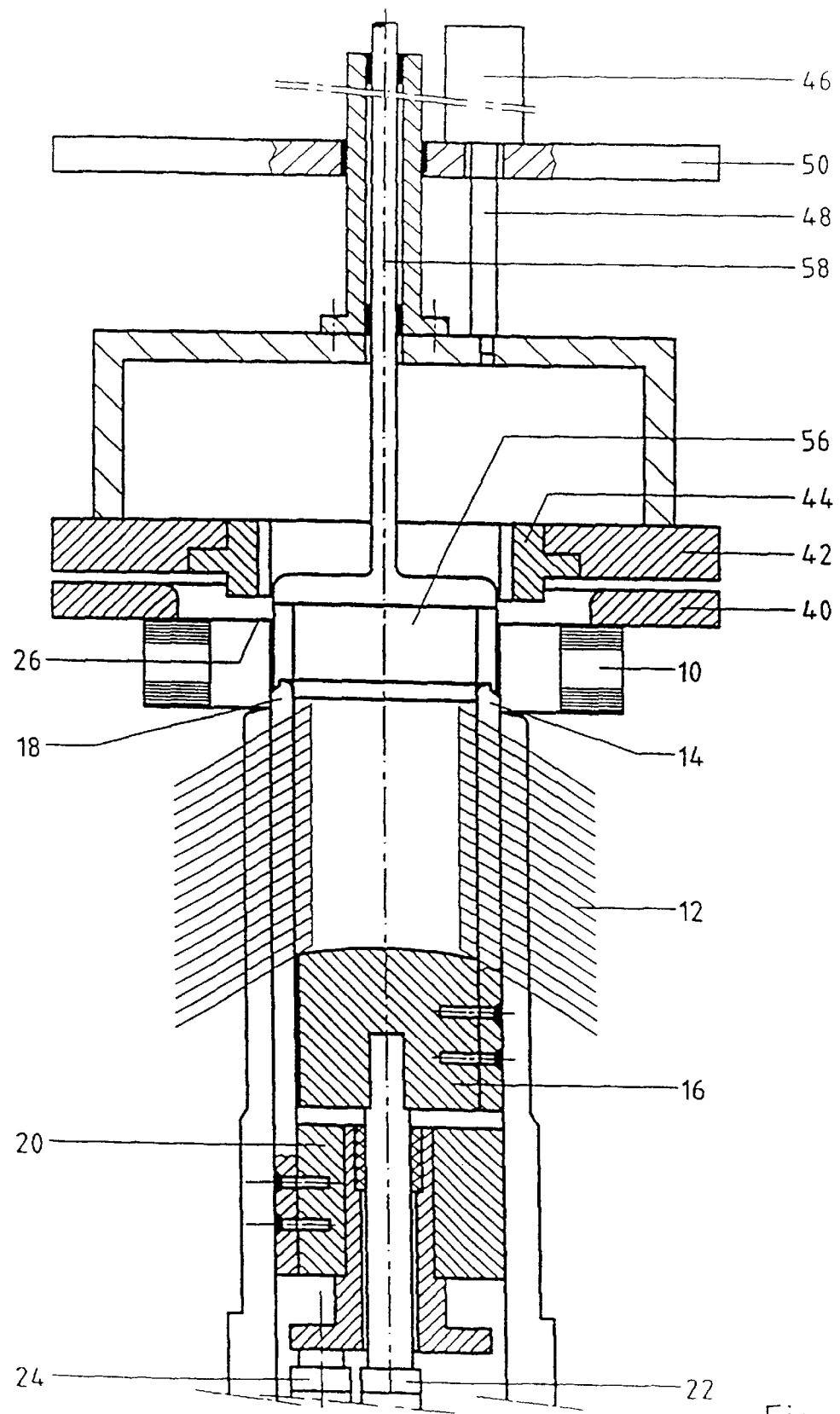
Figure 6:
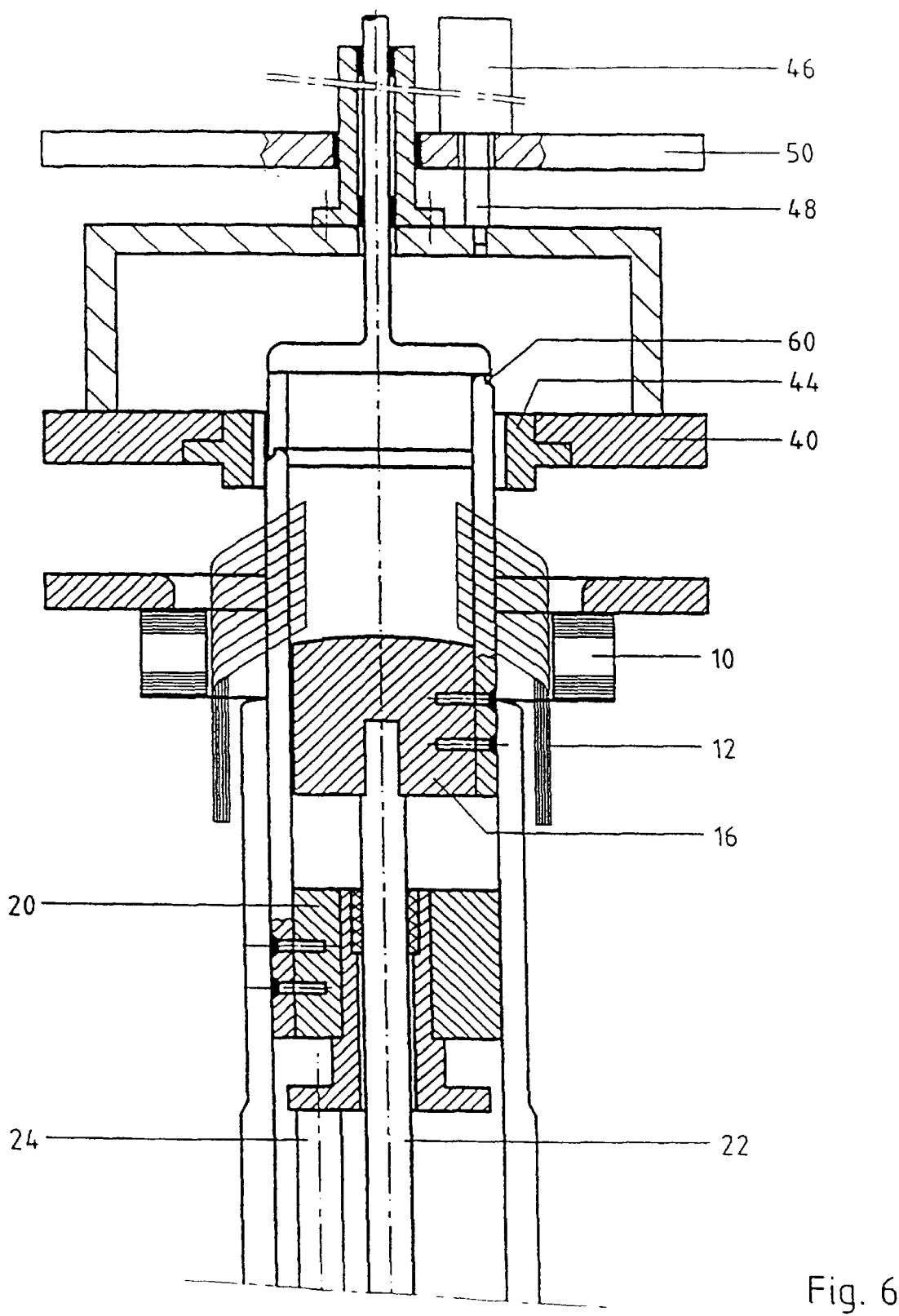
Figure 7:
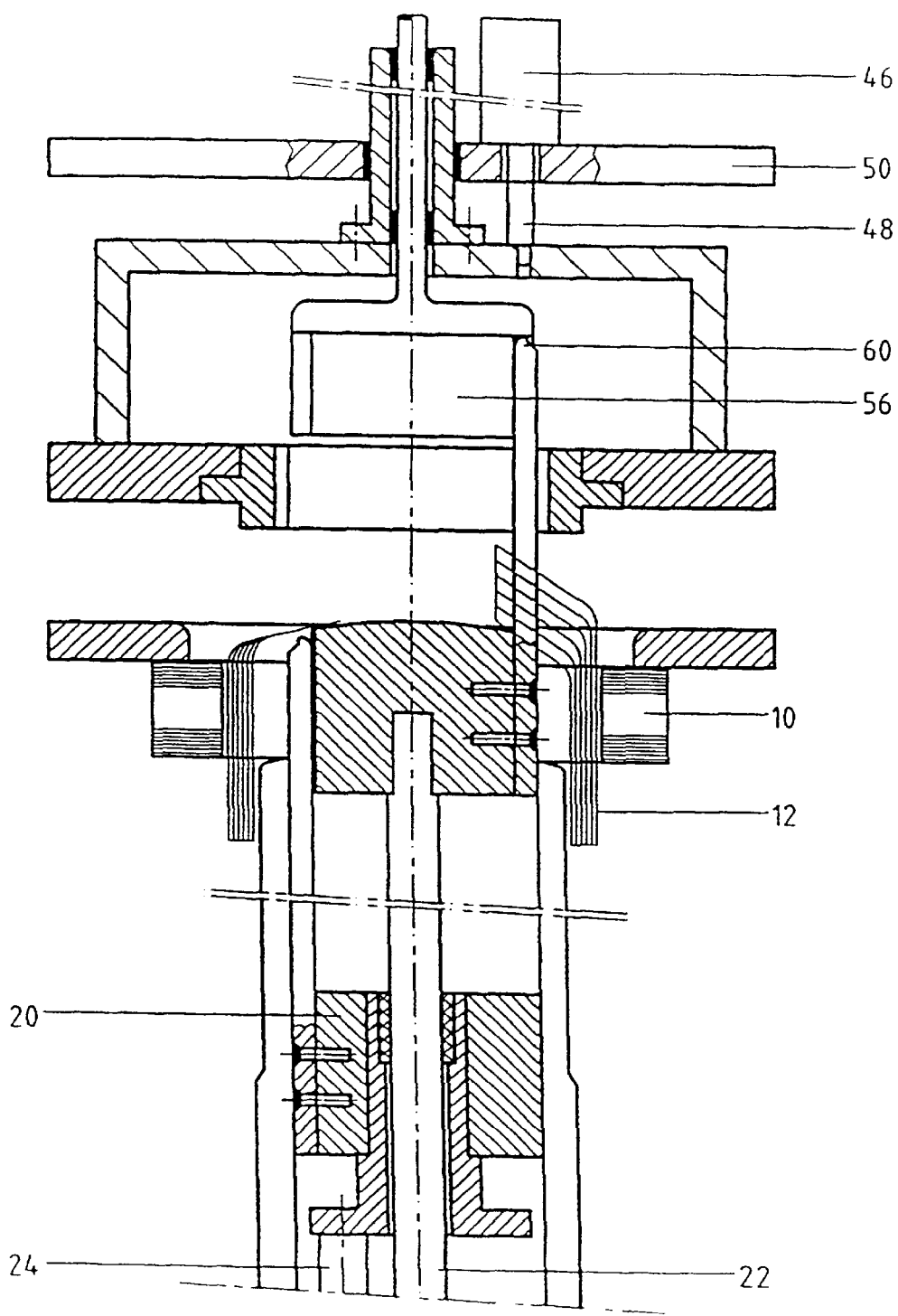

FIGS. 5–7 show insertion tools in individual process steps which have already been described in connection with FIGS. 1–3. A hold-down 40 for the stator has been added, which is necessary, but of secondary importance for this invention.

Important is a support which is disposed axially above the stator 10 and consists in detail of a holding ring 42 with a ring 44 inside of it and a drive 46 with its plunger rod 48. The drive 46 is fastened to a support 50 and connected by its plunger rod 48 to the holding ring 42. The support 50 is not shown in detail here but is affixed to a machine frame for the entire apparatus.

Figure 8:
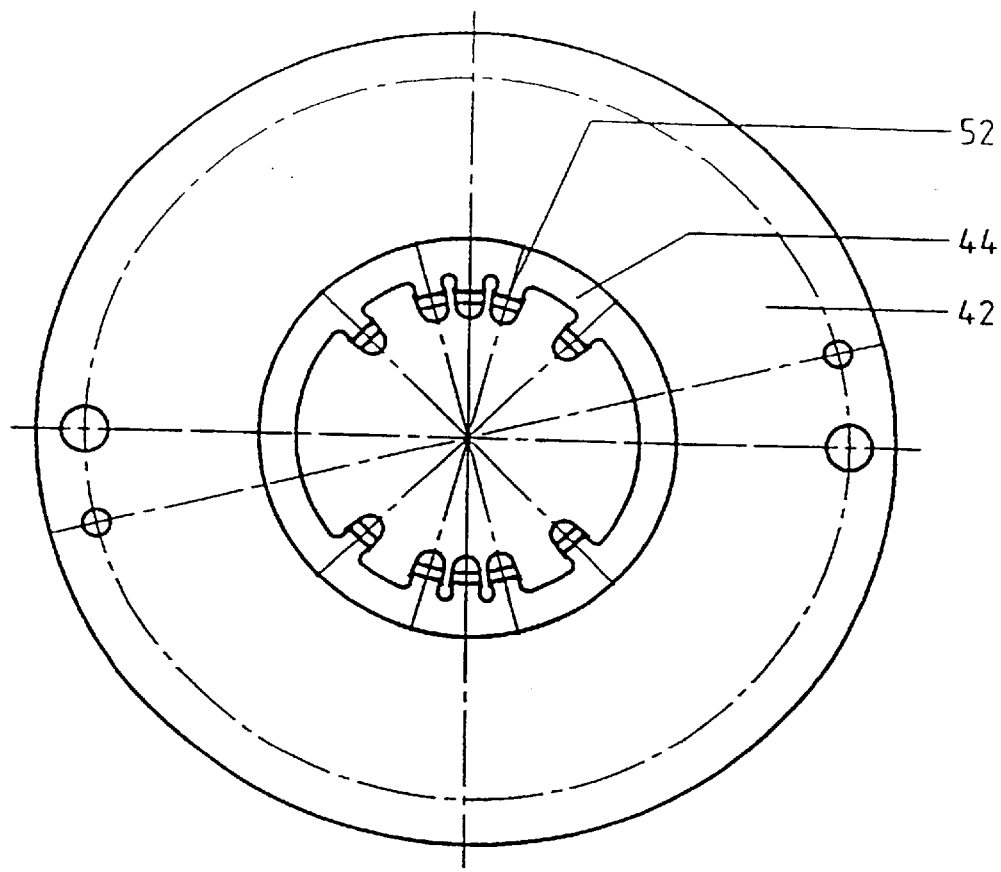

FIG. 8 shows a top view of FIG. 5 in the area of the holding ring 42. An internal supporting ring 44 is mounted in the holding ring 42, and on it the abutments 52 are formed which support the inside insertion shafts from the outside.

Figure 9:
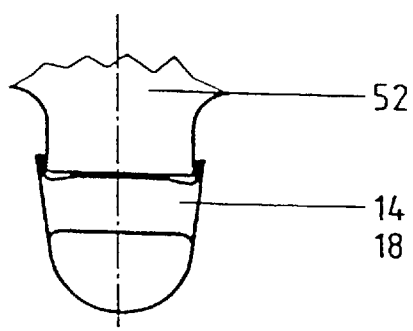
Figure 10:
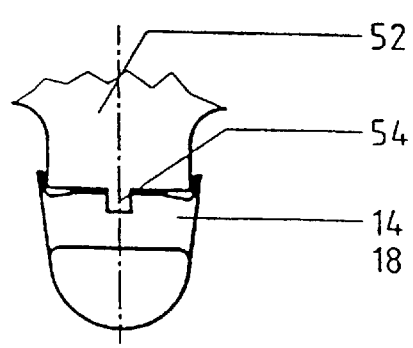

A support for the insertion shafts 14 and 18 can be configured as shown enlarged in FIG. 9, wherein the supporting abutment 52 has a shape resembling a stator land, or a special guide 54 is made by grinding, as shown in FIG. 10. The supporting abutments 52 serve the purpose of holding the insertion shafts 14 and 18 from the outside and guiding them such that the space between the insertion shafts 14 and 18 remains true to size. Quite conceivable but relatively complicated is a possibility of designing the supporting abutments 52 so as to be able to move radially in the supporting ring 44.

To be complete, it can also be mentioned that an alignment block 56 can be moved by a plunger 58 and a drive means not shown, axially over and through the stator 10. Before the stator 10 is placed on the insertion shafts 14 and 18, the alignment block 56 passes through the stator 10 held above the insertion shafts 14 and 18 into the insertion shafts 14 and 18. After the stator 10 has been aligned with the insertion shafts 14 and 18 by means of the alignment block 56, the stator 10 can be placed on the insertion shafts 14 and 18. By the drawing in and forward movement of the insertion shafts 14 and 18, all or at least the short insertion shafts are aligned in the insertion block 56 and additionally centered in area 60.

The manner of operation of the described new support means is that the holding ring 42 with its supporting ring 44 is driven by the drive 46 axially to the stator 10 and takes over and guides the insertion shafts 14 and 18 coming through the stator in the insertion process so that the spacing between the insertion shafts 14 and 18 is accurately maintained even beyond the stator 10.

The manner of operation of the support means according to the process steps already shown is described below, the invention of the support means being advantageous and useful not only for the process according to FIGS. 1–3 but also for other insertion processes, and indeed whenever the steps of the insertion process cause the insertion shafts to extend above the top edge 26 of the stator.

FIG. 5 shows a ring of parallel insertion shafts pointing with their free ends upward, onto which coils 12 have been wound or transferred into spaces between the shafts before a pack of stator laminations 10 has been placed upon them. The ring of insertion shafts consists of short insertion shafts 14, especially every second one in the area of the inserted coils which are tightly screwed to an insertion block 16, and of long insertion shafts 18 which are screwed to a shaft holder 20, the insertion block 16 being axially controllable by means of a jack 22 and the shaft holder 20 by means of a jack 24.

FIG. 6 and FIG. 7 show the same apparatus as FIG. 5, but each at one step further.

Before the first step takes place, the self-guided and centered support runs with its interior supporting ring 44 to a point just ahead of the top edge 26 of the stator in a waiting position.

FIG. 6 shows a process step in which the free ends of the short insertion shafts 14 and the long insertion shafts 18 have been extended on their way through the stator bore and are now beyond the upper edge 26 of the stator. On the way from the position in FIG. 5 to the position in FIG. 6 the insertion shafts 14 and 18 have been running synchronously and have taken the coils 12 and drawn them partially into the stator 10.

In this common forward stroke of all of the insertion shafts 14 and 18 they have all entered, after leaving the stator's top edge 26, into a crown of abutments 52 and are held in alignment by the latter.

Now, from the position in FIG. 6, in which the free ends of the insertion shafts 14 and 18 are above the top edge 26 of the stator, the long insertion shafts 18 are retracted until just above the top edge 26 of the stator, while the insertion block 16 and the short insertion shafts 14 move forward with the support. Therefore the long insertion shafts 18 leave the abutments 52, while the short insertion shafts 14 travel further. In this position FIG. 7, the insertion block 16 together with the short insertion shafts 14 is extended to a position above the stator's top edge 26 and has brought the coils 12 to their end position and thus inserted them. Then the insertion shafts 14 and 18 run from their position FIG. 7 back into the starting position FIG. 5 and the support 42, 44, 52 and hold-down 40 move away from the stator 10 and the finished stator 10 can be removed.

The new support by means of holding ring 42, support ring 44 and abutments 52 assists the new method in that it centers insertion shafts 14 and 18 passing freely above the top edge 26 of the stator and thus reduces the pressure on the stator teeth and serves to prevent wires of the coils from being jammed between the insertion shafts 14 and 18.

As already mentioned, the support means 42, 44 and 52 are independent of the method. It is also conceivable, especially when no great coil thicknesses are present, that a crown of insertion shafts 14 and 15 travel together further forward from position FIG. 6 and pull the coils 12 into the stator 10.

If the insertion pressure in the movement of the insertion shafts 14 and 18 is very high and thus the danger is that some laminations of the stator land may be lifted, an additional support is advantageous, the configuration of which is seen in FIGS. 11 to 14.

Figure 11:
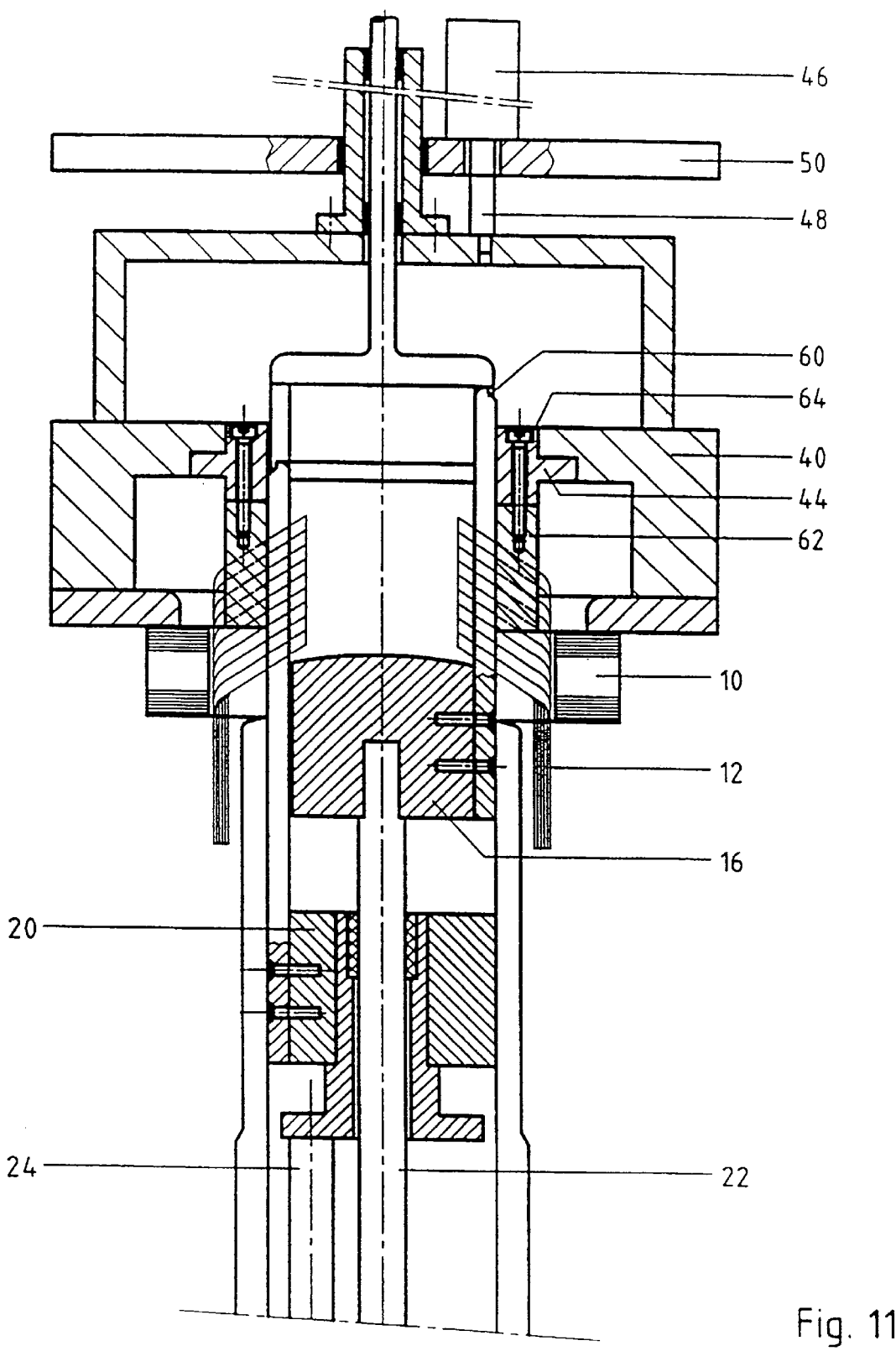
Figure 12:
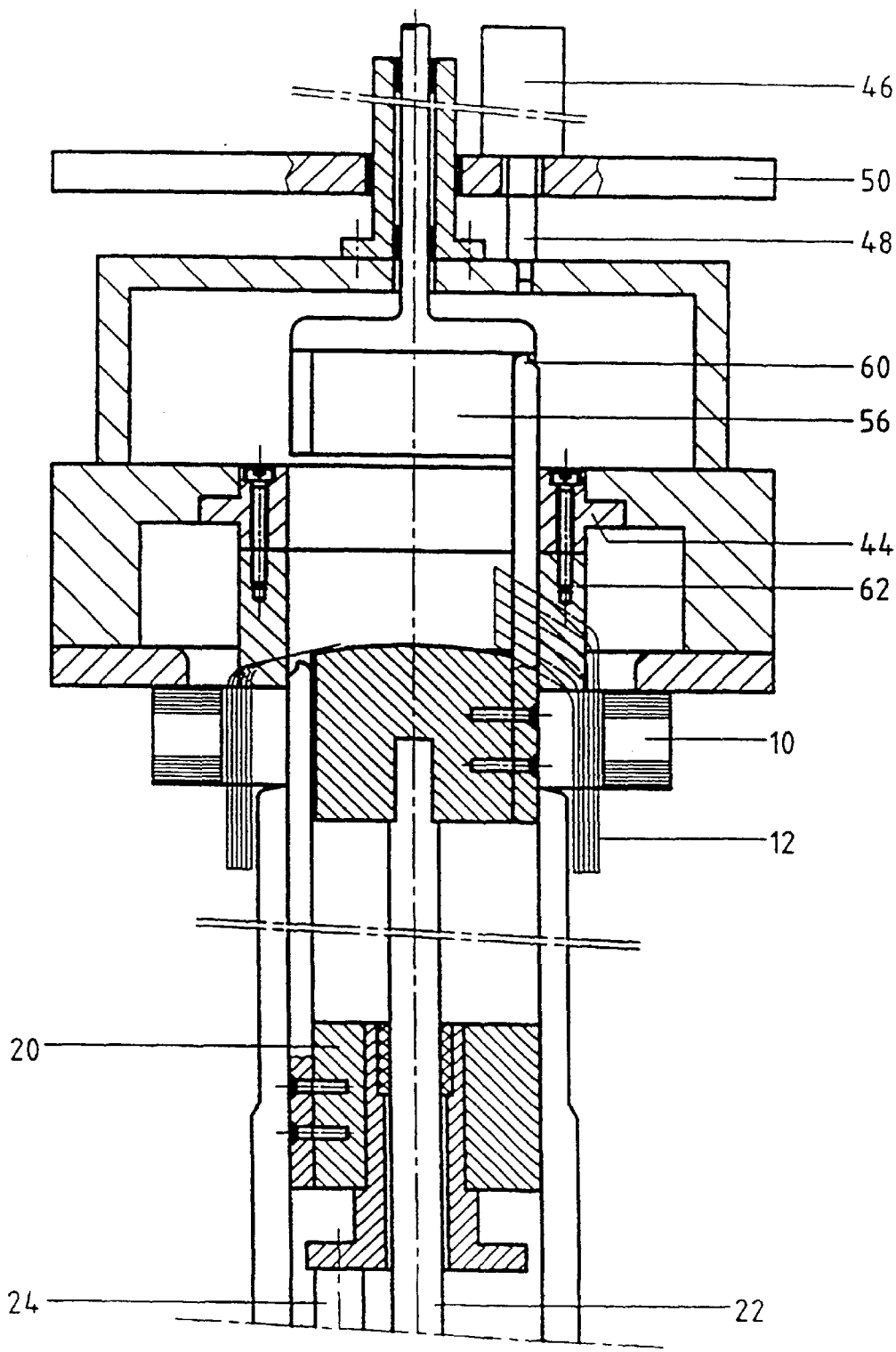

The embodiment in FIGS. 11 and 12 differs substantially from that of FIGS. 6 and 7 in that the abutments 52 present on the supporting ring 44 are prolonged by posts 62 and thus the abutments 52 not only guide the insertion shafts 14 and 18 but also, by means of posts 62, hold down the stator teeth. The posts 62 can be joined to the abutments 52 by screws 64 or can be integral with them and thus form one unit with the hold-down 40.

The unit composed of the hold-down 40 and the posts 62 has the advantage that after the coil 12 has been wound in, the stator 10 can be placed upon the insertion tool, and that this unit then travels axially onto the stator 10 and holds the stator not only, as already mentioned, by the stator pack but also by the stator teeth.

In certain cases it is also conceivable to separate the unit composed of the hold-down 40 and the posts 62 and control them with separate drives, as for example when it is necessary to index the support means 42, 44, 52, 62, for a second insertion process in order to insert a second layer.

Figure 14:
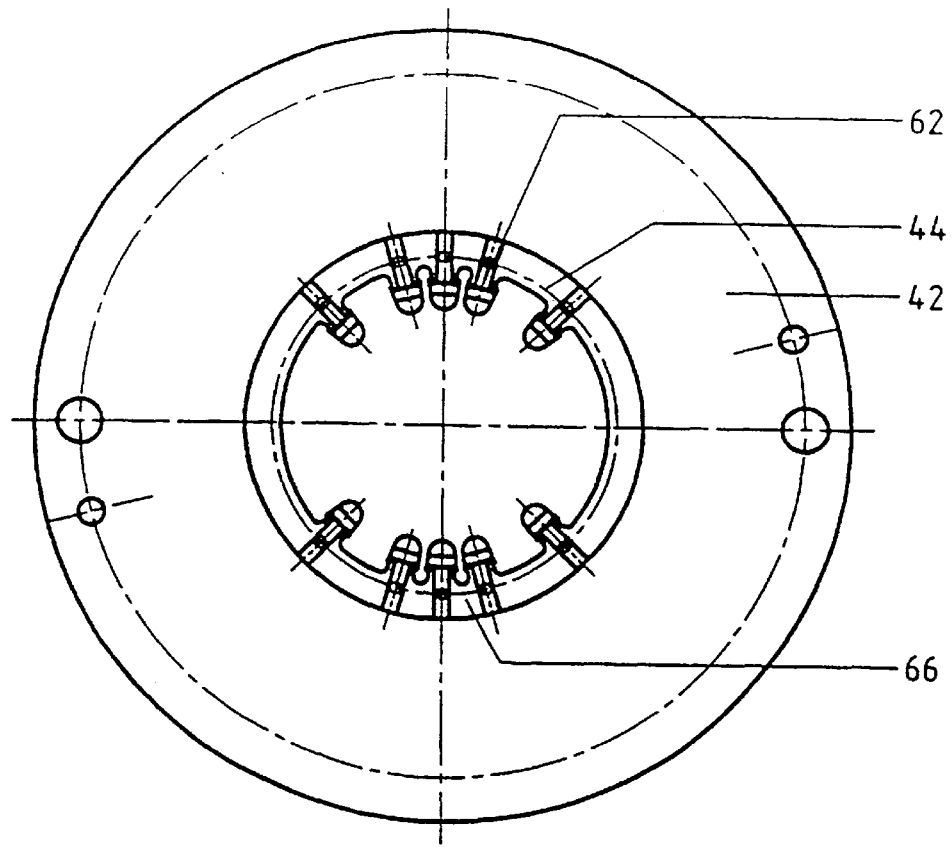
Figure 13:
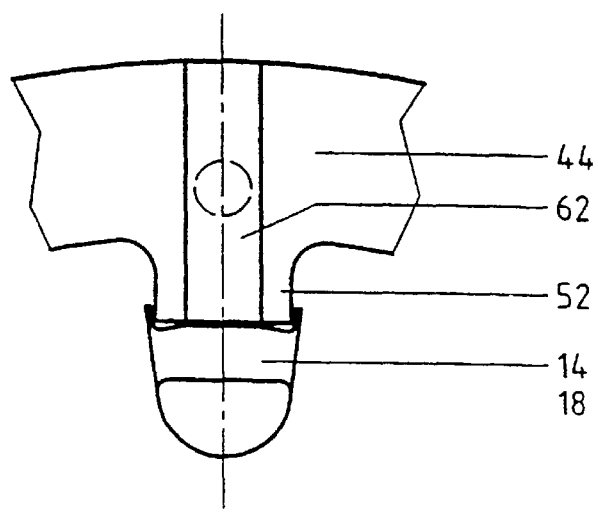

FIGS. 13 and 14 show a support means 42, 44, 52, with the posts 62, FIG. 13 showing an enlarged detail in that a post 62 and a supporting abutment 52 are represented in contact with an insertion shaft 14, 18.

As FIG. 13 indicates, the posts 62 are made narrower than the abutments 52. This has the advantage that the posts 62 can support the stator teeth until the complete coil is inserted. The open space 66 between the posts 62 makes it possible during insertion for the coil has room over the stator to fan out. If in certain cases the posts should hold down every second stator land or lie further apart, the post 62 could have the same shape as the abutments 52.

The use of the prolonged abutments 52 involving posts 62 is independent of the method. However, such use is advantageous in the insertion processes in which accompanying insertion shafts are employed.

The proposed solution is applied especially in the case of compressor motors whose requirements have become more stringent from year to year, and in fact attempts are being made to increase the efficiency of the motors by not only designing the slot to be as small as possible but also bring as much copper wire as possible into the slots. This, however, has a negative effect on the insertion of the coils into the stator, but with the proposed solution stators can still be wound to satisfy the latest requirements.

What is claimed is:

1. A method for drawing windings into slots in laminated stators of electrical machines, said stators having bores, comprising:

producing coils on a form and transferring the coils onto an insertion tool which comprises appropriately annularly arrayed parallel short and long insertion shafts having free ends pointing upwards and an axially driven insertion block fastened to the short insertion shafts; and drawing the coils by the insertion tool into the slots, wherein in a first phase of the insertion process the short insertion shafts and the long insertion shafts with their free ends move upward from a starting position through the bore of the stator past the upper edge of the stator to a second position, and in a second phase the long insertion shafts are retracted to a third position with their free ends just above the upper edge of the stator, while the insertion block and the short insertion shafts move together forward to the third position, and in a third phase the insertion block, the short insertion shafts and the long insertion shafts return from their respective third position to the starting position.

2. A method according to claim 1, wherein in the second phase the long insertion shafts are at least partially retracted before the insertion block and the short insertion shafts travel forward.

3. A method according to claim 2, further comprising, in the second phase, further retracting the long insertion shafts after they have been partially retracted, and then the insertion block and the short insertion shafts travel forward.

4. A method according to claim 1, wherein, in the second phase, the long insertion shafts are retracted, while at the same time the insertion block (16) and the short insertion shafts (14) travel forward.

5. A method according to claim 1, wherein, in the second phase, the long insertion shafts travel in alternation with the insertion block and the short insertion shafts.

6. A method according to claim 5, wherein the long insertion shafts travel from the second position to the third position at the same speed as the short insertion shafts.

7. A method according to claim 1, wherein the insertion block and the short insertion shafts travel together from the starting position with a continuous speed past the second position to the third position.

8. A method according to claim 1, wherein the long insertion shafts run from the second position to the third position with greater speed than the short insertion shafts.

9. An apparatus for drawing windings into slots in laminated stators of electrical machines comprising an insertion block run by means of a first drive, short insertion shafts fastened to the insertion block, a shaft holder run by means of a second drive, and long insertion shafts fastened to said shaft holder, wherein, in a first phase, the first and second drives cause the insertion block and the shaft holder to move the free ends of the short and long insertion shafts synchronously from a starting position past the stator upper edge, to a second position, in a second phase, the second drive reverses and retracts the free ends of the long insertion shafts to a third position just above the stator upper edge, while the first drive drives the free ends of the short insertion shafts forward to the third position, and in a third phase the first and second drives run the insertion block and the shaft holder to move the free ends of the short and long insertion shafts to their starting position.

10. An apparatus according to claim 9, wherein the first and second drives are freely controllable in their speed and direction.

11. An apparatus according to claim 9, wherein a support with abutments is disposed above the top edge of the stator, the abutments coming in contact with the short and long insertion shafts running past the top edge of the stator.

12. An apparatus according to claim 11, wherein the support is disposed axially above the stator.

13. An apparatus according to claim 11, wherein the support is axially movable.

14. An apparatus according to claim 13, wherein the support is movable synchronously with the short and long insertion shafts.

15. An apparatus according to claim 11, wherein said abutments of said support are radially movable.

16. An apparatus according to claim 11 further comprising posts formed on the abutments.

17. An apparatus according to claim 16, wherein the posts are equal to or smaller in their cross section than the abutments.

18. An apparatus according to claim 16 wherein the support forms one unit with a hold-down.

19. An apparatus according to claim 16 wherein the support and the hold-down are movable separately.

* * * * *